United States Patent [19]

Graves

[11] Patent Number: 4,728,121

[45] Date of Patent: Mar. 1, 1988

[54] FOOT PROTECTOR APPARATUS FOR MULTI-WHEELED RECREATIONAL VEHICLES

[76] Inventor: Elmer L. Graves, 1501 SW. 68th, Oklahoma City, Okla. 73159

[21] Appl. No.: 12,365

[22] Filed: Feb. 9, 1987

[51] Int. Cl.⁴ ............................................. B62J 25/00
[52] U.S. Cl. ............................. 280/748; 280/289 G; 280/291; 280/760; 180/90.6; 296/75
[58] Field of Search ............... 280/748, 756, 757, 760, 280/770, 289 G, 289 E, 281, 160.1, 161, 748, 289 G, 291, 760; 180/90.6; 296/75, 37.14

[56] References Cited

U.S. PATENT DOCUMENTS 3,902,740 9/1975 Lucier et al. .................... 280/289 G
3,981,521 9/1976 See .................................. 280/760
4,451,057 5/1984 Lawson ........................... 280/291

Primary Examiner—Richard A. Bertsch
Attorney, Agent, or Firm—Bill D. McCarthy

[57] ABSTRACT

A foot protector apparatus for a multi-wheeled motorcycle type recreational vehicle which substantially prevents contact of the operator's feet or legs with the rear wheels of the vehicle. The apparatus comprises a grille assembly positioned on opposing sides of the vehicle for supporting each of the operator's feet in a traveling position, and a bracket assembly for mounting each of the grille assemblies to the recreational vehicle. Each of the grille assemblies, when connected to the recreational vehicle by the bracket assembly an effective distance from the adjacent rearward wheels, prevents the passage of the operator's feet beyond a barrier plane formed by the grille assemblies.

7 Claims, 6 Drawing Figures

FOOT PROTECTOR APPARATUS FOR MULTI-WHEELED RECREATIONAL VEHICLES

BACKGROUND OF THE INVENTION

1. Field of the Invention

The present invention relates generally to off-the-road multi-wheeled recreational vehicles, and more particularly but not by way of limitation, to a foot protector apparatus for three and four-wheeled motorcycle type recreational vehicles.

2. Brief Statement of the Prior Art

In recent years, popularity of off-the-road recreational vehicles, such as three and four-wheeled motorcycle type vehicles, has become wide spread. Such vehicles are constructed with a foot peg on each side of the vehicle at a position just in front of the rear wheels to support the operator's feet as the vehicle travels. The terrain over which such three and four-wheeled motorcycle type vehicles travel is often rough, and as result of the movement of the vehicle over rough terrain, there is a propensity for the operator's feet to become disengaged from the foot pegs. When such occurs the operator is exposed to a hazardous condition in that the rear wheels of the vehicle can catch the operator's feet to pull the operator from the vehicle and underneath the vehicle. This can result in severe injury and even death to the operator.

Therefore, it would be highly desirable if one could provide a foot protector apparatus for such multi-wheeled recreational vehicles which would substantially eliminate the possibility of the rear wheels engaging the feet of the operator, while at the same time, providing the desired support for the operator's feet. It is to such an apparatus that the subject invention is directed.

SUMMARY OF THE INVENTION

According to the present invention a foot protector apparatus for attachment to a multi-wheeled motorcycle type recreational vehicle is provided which substantially eliminates contact of the operator's feet or legs with the rear wheels of the vehicle. Broadly, the apparatus comprises a grille assembly positioned on opposing sides of the vehicle for supporting each of the operator's feet in a traveling position, and a bracket assembly for mounting each of the grille assemblies to the recreational vehicle. Each of the grille assemblies, when connected to the recreational vehicle by the bracket assembly an effective distance from the adjacent rearward wheels, prevents the passage of the operator's feet beyond a barrier plane formed by the grille assemblies.

An object of the present invention is to provide a foot protector apparatus for three and four-wheeled motorcycle type recreational vehicles.

Another object of the present invention, while achieving the above stated object, is to provide a foot protector apparatus for three and four-wheeled motorcycle type recreational vehicles which will substantially prevent injury to the operator by inadvertent contact of the operator's feet or legs with the rearward wheels of the vehicle.

Another object of the present invention, while achieving the above stated objects, is to provide a foot protector apparatus for three and four-wheeled motorcycle type recreational vehicles which will not impair the operation of the vehicle, or the operator's use of the vehicle.

Another object of the present invention, while achieving the above stated objects, is to provide a foot protector apparatus for three and four-wheeled motorcycle type recreational vehicles which is economical to manufacture, and which does not require extensive modification to the recreational vehicle.

Other objects, advantages and features of the present invention will become apparent upon reading of the following description when read in conjunction with the drawings and appended claims.

DESCRIPTION

Figure 1:
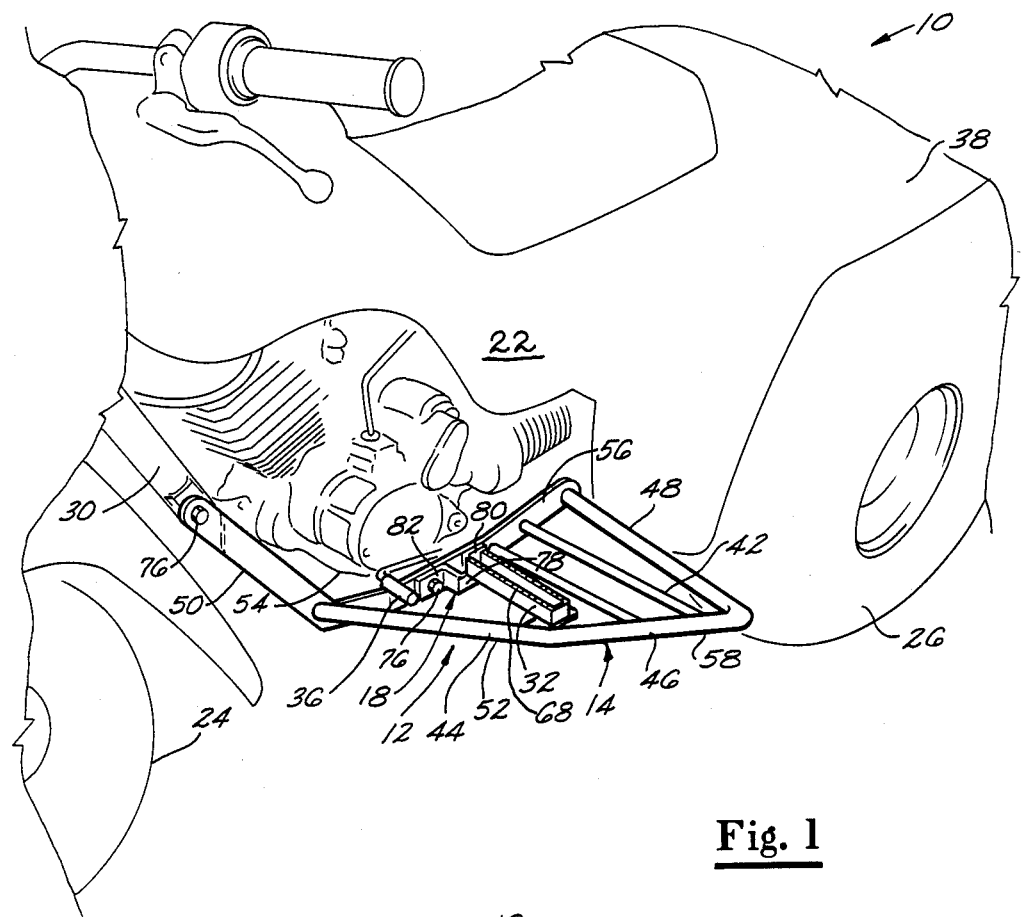
FIG. 1 is a fragmentary, perspective view of a three-wheeled motorcycle type recreational vehicle having a foot protector apparatus of the present invention connected to the left side of the vehicle.
Figure 2:
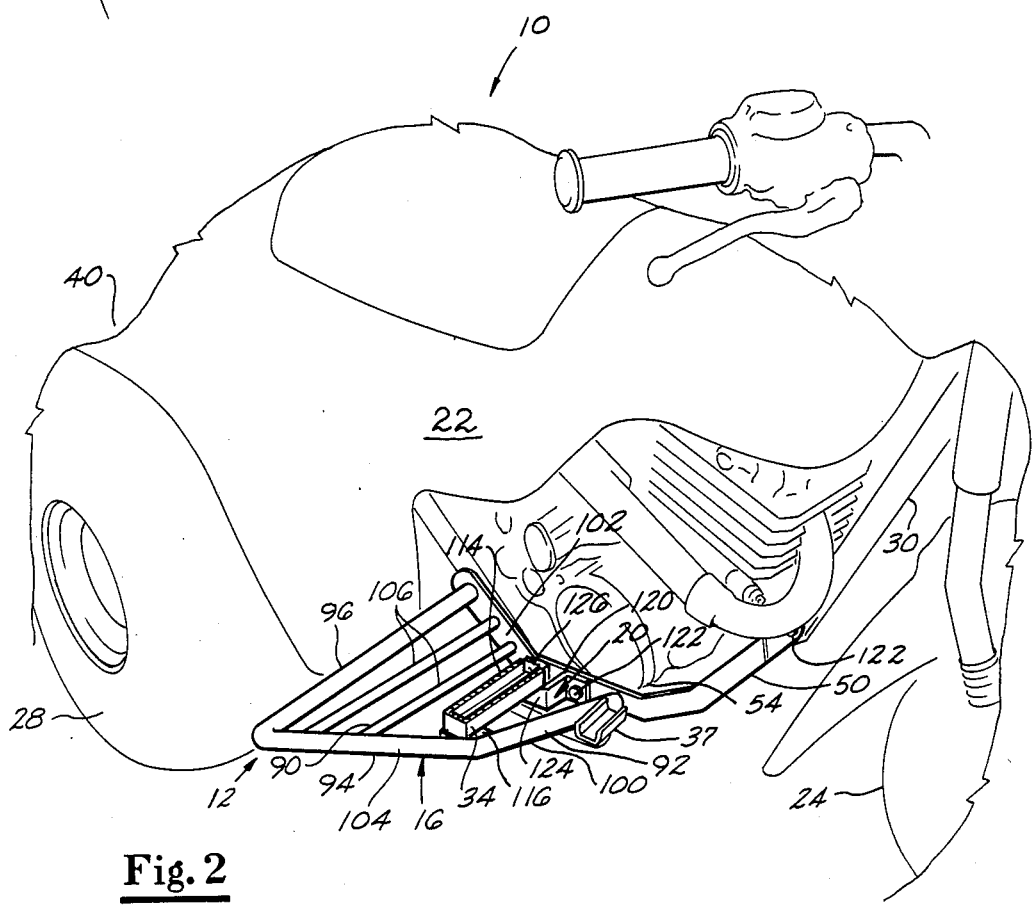
FIG. 2 is a fragmentary, perspective view of the three-wheeled motorcycle type recreation vehicle of FIG. 1 having the foot protector apparatus of the present invention connected to the right side of the vehicle.

Referring now to the drawings, and more particularly to FIG. 1 and 2, a three-wheeled motorcycle type recreational vehicle 10, also referred to herein simply as the recreational vehicle, is illustrated having a foot protector apparatus 12 of the present invention connected thereto. The foot protector apparatus 12 comprises a pair of foot support or grille assemblies 14 and 16 and a pair of bracket assemblies 18 and 20 for mounting the grille assemblies 14 and 16 to the recreational vehicle 10. It should be noted that while the foot protector apparatus 12 is illustrated with the three-wheeled recreational vehicle 10, the foot protector apparatus 12 can also be used with a fourwheeled motorcycle type recreational vehicle. Thus, the term "multi-wheeled recreational vehicle" as used herein is understood to be three and four-wheeled motorcycle type vehicles wherein the operators legs and feet are disposed in front of the rear wheels, and thereby exposed to such rear wheels, during operation of the vehicle.

The recreational vehicle 10 is of conventional construction and includes a body portion 22, at least one forward wheel 24, a pair of rearward wheels 26 and 28, and a front stabilizer frame member 30. A foot peg 32 is connected to the body portion 22 of the recreational vehicle 10 near the rearward wheel 26; and a foot peg 34 is connected to the body portion 22 of the recreational vehicle 10 near the rearward wheel 28. The foot pegs 32, 34 extend outwardly from the body portion 22 so that the operator's feet can be positioned and supported thereon as the recreational vehicle 10 travels across terrain.

The recreational vehicle 10 is further characterized as having a gear-shifting lever 36, a brake pedal 37, and rear fenders 38 and 40 positioned over the rearward wheels 26 and 28, respectively. The recreational vehicle 10 so described, with the exception of the foot protector apparatus 12 of the present invention, is of conventional construction and well known in the art. Thus, no further description of the recreational vehicle 10 is believed necessary to enable one to understand and appreciate the foot protector apparatus 12, and the connection of the foot protector apparatus 12 to the recreational vehicle 10.

The grille assembly 14 is connected to the recreational vehicle 10 by the bracket assembly 18 such that the grille assembly 14 is disposed in near proximity to the foot peg 32 and the rearward wheel 26 (substantially as shown in FIG. 1). The grille assembly 14, in addition to cooperating with the foot peg 32 for supporting the operator's left foot, defines a barrier plane beyond which the operator's left foot is prevented from passing. Further, the grille assembly 14 is connected to the recreational vehicle 10 by the bracket assembly 18 such that the barrier plane defined by the grille assembly 14 is disposed an effective distance from the rearward wheel 26 to prevent inadvertent contact of the operator's left foot or leg with the rearward wheel 26.

Similarly, the grille assembly 16 is connected to recreational vehicle 10 by the bracket assembly 20 such that the grille assembly 16 is disposed in near proximity to the foot peg 34 and the rearward wheel 28 (substantially as shown in FIG. 2). The grille assembly 16, in addition to cooperating with the foot peg 34 for supporting the operator's right foot, defines a barrier plane beyond which the operator's right foot is prevented from passing. Further, the grille assembly 16 is connected to the recreational vehicle 10 by the bracket assembly 20 such that the barrier plane defined by the grille assembly 16 is disposed an effective distance from the rearward wheel 28 to prevent inadvertent contact of the operator's right foot or leg with the rearward wheel 28.

The grille assembly 14 comprises a barrier platform 42 having a forward portion 44, a medial portion 46 and a rearward portion 48, a forward stabilizing bar 50 and a foot protector bar 52. The forward stabilizing bar 50 is attached to the forward portion 44 of the barrier platform 42 and angulated generally forwardly and upwardly for connection to the front stabilizer frame member 30 of the recreational vehicle 10 by the bracket assembly 18. The medial portion 46 of the barrier platform 42 is secured to the body portion 22 of the recreational vehicle 10, such as the crankcase housing 54, by the bracket assembly 18 so that medial portion 46 is substantially horizontally disposed for receiving and supporting the operator's left foot, and the rearward end portion 48 is in a substantially flush disposition forwardly adjacent the rear fender 38 of the recreational vehicle 10 substantially as shown in Fig. 1. Thus, the barrier platform 42 cooperates with the foot peg 32 for supporting the operator's left foot, while at the same time defining the barrier plane for preventing contact of the operator's left leg or foot with the rearward wheel 26.

Figures 3A, 3B:
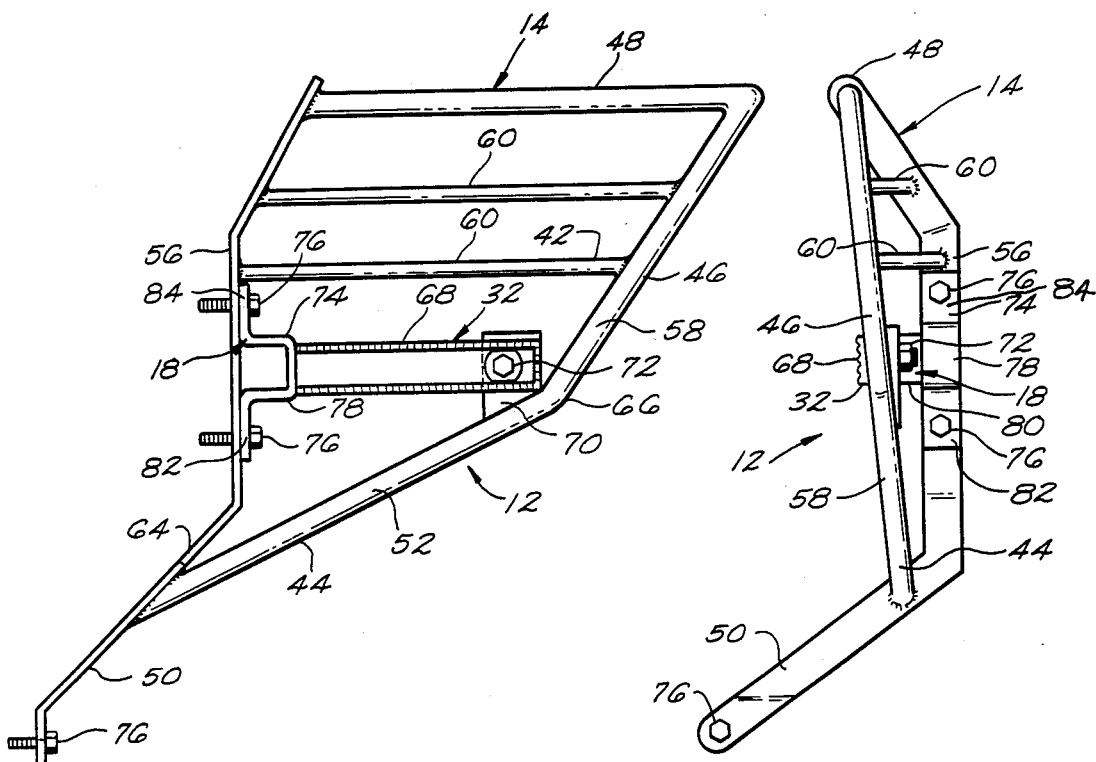
FIG. 3A is a top plan view of the foot protector apparatus of FIG. 1.
FIG. 3B is a side elevational view of such foot protector apparatus.

The barrier platform 42 comprises a first side member 56 positionable adjacent the supporting frame member of the recreational vehicle 10, such as the crankcase housing 54, a spatially disposed second side member 58 and a plurality of spatially disposed support members 60 extending between and connected to the first and second side members 56, 58. The foot protector bar 52 is supported by the forward stabilizing bar 50 in close proximity to the junction between the first side member 56 and the forward stabilizing bar 50 and a forward end 66 of the second side member 58 subtantially as shown in FIG. 3A. The connection of the forward stabilizing bar 50 to the first side member 56 permits the grille assembly 14 to be secured to the recreational vehicle 10 by the bracket assembly 18 without interferring with the operation of gear-shifting lever 36.

The foot protector bar 52, which defines the forwardmost end of the barrier platform 42, is disposed between the forward stabilizing bar 50 and second side member 58 so as to extend at a rearwardly facing angle such that the forward portion 44 of the barrier platform 42 presents an outwardly and rearwardly flowing strike barrier. The disposition of foot protector bar 52 is believed important for the stability of the recreational vehicle 10. That is, when the recreational vehicle 10 is traveling over rough terrain and the foot protector bar 52 strikes a fixed object, such as a stump, the angulated disposition of the foot protector bar 52 will cause the recreational vehicle 10 to slidingly disengage the fixed object at the angle of the foot protector bar 52, rather than causing the recreational vehicle 10 to either tip forward, abruptly turn which may result in loss of control of the recreational vehicle 10 by the operator, or tip over in a sideways direction.

To improve the stability of the barrier platform 42 when connected to the recreational vehicle 10 by the bracket assembly 18, the forward stabilizing bar 50 of the grille assembly 14 is attached to the forward end of the first side member 56. The first side member 56 and the forward stabilizing bar 50 are desirably formed of unitary construction, and the forward stabilizing bar 50 extends from the forward end of the first side member 56 so as to be angulated forwardly and upwardly for connection to the front stabilizer frame member 30 of the recreational vehicle 10.

To stabilize the foot peg 32 relatively to the barrier platform 42, and to secure the disposition of the foot peg 32 so that its upper surface 68 is desirably disposed above the plane of the support members 60 forming the medial portion 46 of the barrier platform 42, the grille assembly 14 further comprises a foot peg support member 70 connected to the foot protector bar 52 in close proximity to the junction between the foot protector bar 52 and the second side member 58. The distal end of the foot peg 32 can be secured to the foot peg support member 70 by any suitable means, such as bolt 72.

As previously stated, the grille assembly 14 is connected to the left side of the recreational vehicle 10 by the bracket assembly 18. As shown in FIGS. 1, 3A and 3B, the bracket assembly 18 comprises a bracket member 74 supported by the first side member 56 of the barrier platform 42 and connecting members, such as bolts 76, for connecting the bracket member 74 to a structural component of the recreational vehicle 10, such as the crankcase housing 54; and for connecting the forward stabilizing bar 50 of the barrier platform 42 to the front stabilizer frame member 30 of the recreational vehicle 10.

The bracket member 40 is provided with a substantially U-shaped medial portion 78 having a tab 80 extending upwardly therefrom, and attaching support members 82 and 84 extending outwardly from the U-shaped medial portion 78 substantially as shown in FIG. 3A. The bracket member 74 is secured to a structural component of the recreation vehicle 10, such as the crankcase housing 54, via the first side member 56 and the bolts 76. Similarly, the forward stabilizer bar 50 is secured to the front stabilizer frame member 30 by the bolt 76. Thus, the bolts 76 serves as the connecting members for connecting the bracket assembly 18 to the recreational vehicle 10.

One end of the foot peg 32 is connected to the tab 80 of the bracket member 74 such that the distal end of the foot peg 32 is supported by the foot peg support member 70 of the barrier platform 42 and secured thereto by the bolt 72. Thus, the tab 80 and foot support member 70 cooperate to support the foot peg 32 such that its upper surface 68 is disposed above the plane of the medial portion 46 of the barrier platform 42.

Figures 4A, 4B:
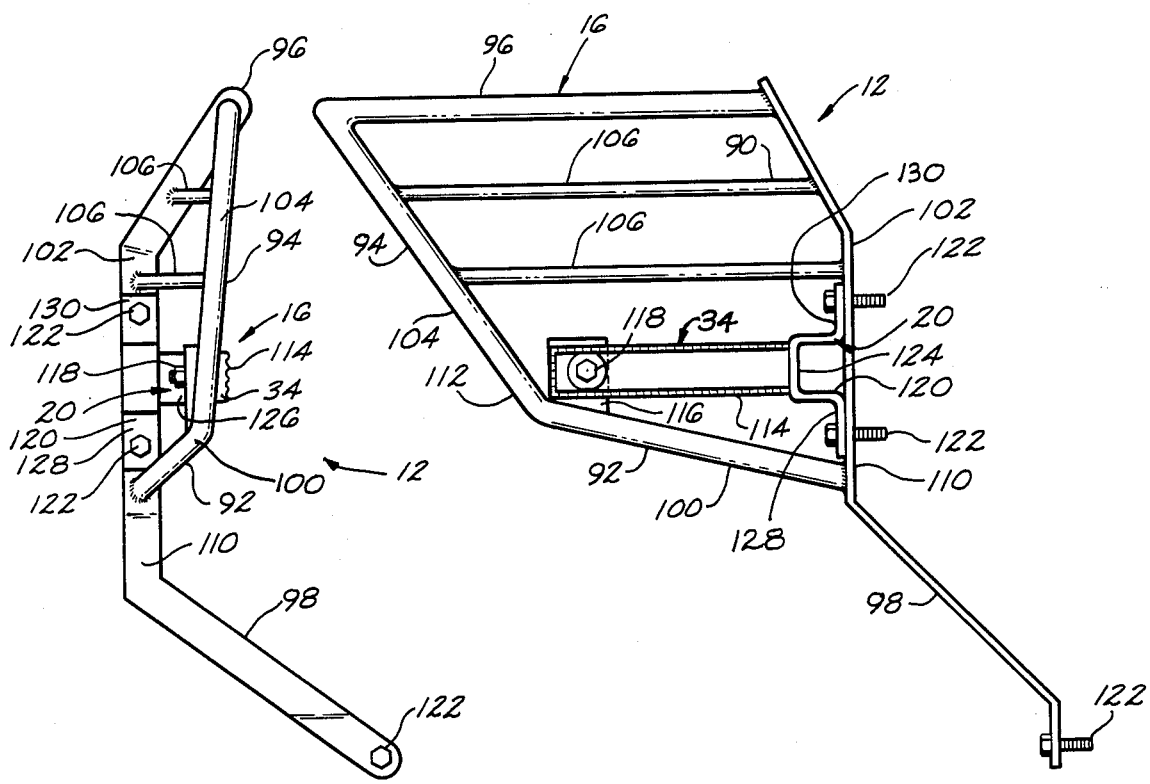
FIG. 4A is a top plan view of the foot protector apparatus of FIG. 2.
FIG. 4B is a side elevational view of such foot protector.

Referring now to FIGS. 2, 4A and 4B, the grille assembly 16, which is similar in construction to the grille assembly 14, comprises a barrier platform 90 having a forward portion 92, a medial portion 94 and a rearward portion 96, a forward stabilizing bar 98 and a foot protector bar 100. The forward stabilizing bar 98 is attached to the forward portion 92 of the barrier platform 90 and angulated generally forwardly and upwardly for connection to the front stabilizer frame member 30 of the recreational vehicle 10 by the bracket assembly 20. The medial portion 94 of the barrier platform 90 is secured to the body portion 22 of the recreational vehicle 10, such as the crankcase housing 54, by the bracket assembly 20 so that medial portion 94 is substantially horizontally disposed for receiving and supporting the operator's right foot, and the rearward end portion 96 is in a substantially flush disposition forwardly adjacent the rear fender 40 of the recreational vehicle 10 substantially as shown in Fig. 2. Thus, the barrier platform 90 cooperates with the foot peg 34 for supporting the operator's right foot, while at the same time defining the barrier plane for preventing contact of the operator's right leg or foot with the rearward wheel 28.

The barrier platform 90 comprises a first side member 102 positionable adjacent the supporting frame member of the recreational vehicle 10, such as the crankcase housing 54, a spatially disposed second side member 104, and a plurality of spatially disposed support members 106 extending between and connected to the first and second side members 102, 104. The foot protector bar 108 supported by a forward end 110 of the first side member 102 and a forward end 112 of the second side member 104. The foot protector bar 100, which defines the forward end of the barrier platform 90, is disposed between the first and second side members 102, 104 so as to extend at a rearwardly facing angle such that the forward portion 92 of the barrier platform 90 presents an outwardly and rearwardly flowing strike barrier. The disposition of foot protector bar 100 is believed important for the stability of the recreational vehicle 10. That is, when the recreational vehicle 10 is traveling over rough terrain and the foot protector bar 100 strikes a fixed object, such as a stump, the angulated disposition of the foot protector bar 100 will cause the recreational vehicle 10 to slidingly disengage the fixed object at the angle of the foot protector bar 100, rather than causing the recreational vehicle 10 to either tip forward, abruptly turn which may result in loss of control of the recreational vehicle 10 by the operator, or tip over in a sideways direction.

To improve the stability of the barrier platform 90 when connected to the recreational vehicle 10 by the bracket assembly 20, the forward stabilizing bar 98 of the grille assembly 16 is attached to the forward end of the first side member 102. The first side member 102 and the forward stabilizing bar 98 are desirably formed of unitary construction, and the forward stabilizing bar 98 extends from the forward end of the first side member 102 so as to be angulated forwardly and upwardly for connection to the front stabilizer frame member 30 of the recreational vehicle 10.

To stabilize the foot peg 34 relatively to the barrier platform 90, and to secure the disposition of the foot peg 34 so that its upper surface 114 is desirably disposed above the plane of the support members 106 forming the medial portion 94 of the barrier platform 90, the grille assembly 16 further comprises a foot peg support member 116 connected to the foot protector bar 100 in close proximity to the junction between the foot protector bar 100 and the second side member 104. The distal end of the foot peg 34 can be secured to the foot peg support member 116 by any suitable means, such as bolt 118.

As previously stated, the grille assembly 16 is connected to the right side of the recreational vehicle 10 by the bracket assembly 20. As shown in FIGS. 2, 4A and 4B, the bracket assembly 20 comprises a bracket member 120 supported by the first side member 102 of the barrier platform 90 and connecting members, such as bolts 122, for connecting the bracket member 120 to a structural component of the recreational vehicle 10, such as the crankcase housing 54; and for connecting the forward stabilizing bar 98 of the barrier platform 90 to the front stabilizer frame member 30 of the recreational vehicle 10.

The bracket member 120 is provided with a substantially U-shaped medial portion 124 having a tab 126 extending upwardly therefrom, and attaching support members 128 and 130 extending outwardly from the U-shaped medial portion 124 substantially as shown in FIG. 4A. The bracket member 120 is secured to a structural component of the recreation vehicle 10, such as the crankcase housing 54, via the first side member 102 and the bolts 122. Similarly, the forward stabilizer bar 98 is secured to the front stabilizer frame member 30 by the bolt 122. Thus, the bolts 122 serves as the connecting members for connecting the bracket assembly 18 to the recreational vehicle 10.

One end of the foot peg 34 is connected to the tab 126 of the bracket member 120 such that the distal end of the foot peg 34 is supported by the foot peg support member 116 of the barrier platform 90 and secured thereto by the bolt 118. Thus, the tab 126 and foot support member 116 cooperate to support the foot peg 34 such that its upper surface 114 is disposed above the plane of the medial portion 94 of the barrier platform 90.

The grille assemblies 14 and 16, as well as the bracket assemblies 18 and 20 of the foot protector apparatus 12 of the present invention can be fabricated of any suitable material having the desired structural strength, such as iron, steel and the like. Further, the overall configuration or shape of the grille assemblies 14 and 16 can be varied provided the alternate shape permits the grille assemblies to function as hereinbefore described. Thus, it is clear that the present invention is well adapted to carry out the objects and attain the ends and advantages mentioned as well as those inherent therein. While presently preferred embodiments of the invention have been described for purposes of this disclosure numerous changes may be made which will readily suggest themselves to those skilled in the art and which are encompassed within the spirit of the invention disclosed and as defined in the appended claims.

What is claimed is:

1. A foot protector apparatus for a multi-wheeled recreational vehicle wherein the recreational vehicle is provided with two rearward wheels and a foot peg positioned on each side of the recreational vehicle so as to be disposed forward the rearward wheels such that an operator's foot is positionable on each foot peg of the recreational vehicle, the foot protector apparatus comprising:

grille means for supporting each of the operator's feet and preventing the passage of the operator's feet beyond a barrier plane thereof; and prevent contact of the operator's feet with the rearward wheels of the recreational vehicle.

2. The foot protector apparatus of claim 1 wherein the recreational vehicle is further characterized as having rear fenders over the rearward wheels, and wherein the grille means comprises right and left grille assemblies mountable to the recreational vehicle by the bracket means so as to be disposed on opposing sides of the recreational vehicle, each grille assembly comprising:

a barrier platform having aforward and rearward portions thereof, the rearward portion being disposed in a substantially flush disposition forwardly adjacent one of the rearward fenders of the vehicle.

3. The foot protector apparatus of claim 2 wherein the recreational vehicle is further characterized as having a front stabilizer frame member, and wherein each of the grille assemblies has a forward stabilizing bar attached to the forward portion of its respective barrier platform, the forward stabilizing bar being angulated generally forwardly and upwardly so as to be connectable to the front stabilizer frame member of the recreational vehicle, and wherein the bracket means further comprises frame connecting means adapted to connect the forward stabilizing bars of each grille assembly to the front stabilizer frame member of the recreational vehicle.

4. The foot protector apparatus of claim 3 wherein each of the barrier platforms has a foot protector bar supported at the forward portion of its respective grille assembly and angularly disposed to extend at a rearwardly facing angle so that the forward portion of each grille assembly presents an outwardly and rearwardly flowing strike barrier edge.

5. The foot protector apparatus of claim 4 wherein the bracket means comprises:

a pair of brackets, each of which is supported by one of the right and left barrier platform, each bracket comprising at least one attaching support member and a tab member extending upwardly therefrom, the tab member adapted to support one of the foot pegs of the recreational vehicle; and connecting means for connecting the attaching support members of each bracket to the recreational vehicle.

6. The foot protector apparatus of claim 5 wherein each of the brackets is provided with a substantially U-shaped medial portion, each of the tab members of the brackets supported by the U-shaped medial portion of one of the brackets so as to extend upwardly therefrom, the foot pegs of the recreational vehicle being connectable to the tab members of the brackets such that a portion of each foot peg of the recreational vehicle is disposed above the barrier plane of its respective supporting barrier platform.

7. The foot protector apparatus of claim 6 wherein said grille means further comprises a pair of foot peg support members one of said foot peg support members being supported by the foot protector bar of the right and left grille assemblies for supporting a distal end of the foot pegs; and connector means for connecting the distal end of said of the foot pegs to one of the foot peg support members.

* * * * *

UNITED STATES PATENT AND TRADEMARK OFFICE
CERTIFICATE OF CORRECTION

PATENT NO. : 4,728,121

DATED : March 1, 1988

INVENTOR(S) : Elmer L. Graves

Page 1 of 2

It is certified that error appears in the above-identified patent and that said Letters Patent is hereby corrected as shown below:

In column 3, line 67, the word "subtantially" should read --substantially--.

In column 7, lines 9 - 13 of claim 1, the elements reading:

"grille means for supporting each of the operator's feet and preventing the passage of the operator's feet beyond a barrier plane thereof; and prevent contact of the operator's feet with the rearward wheels of the recreational vehicle."

should read:

--grille means for supporting each of the operator's feet and preventing the passage of the operator's feet beyond a barrier plane thereof; and
bracket means adapted to mount the grille means to the recreational vehicle in near proximity to the foot pegs so that the barrier plane is disposed thereby an effective distance from each of the rearward wheels to prevent contact of the operator's feet with the rearward wheels of the recreational vehicle.--

UNITED STATES PATENT AND TRADEMARK OFFICE
CERTIFICATE OF CORRECTION

PATENT NO. : 4,728,121
DATED : March 1, 1988
INVENTOR(S) : Elmer L. Graves

It is certified that error appears in the above-identified patent and that said Letters Patent is hereby corrected as shown below:

In column 7, line 22 of claim 2, the words "having aforward" should read --having forward--.

Signed and Sealed this

Nineteenth Day of July, 1988

Attest:

DONALD J. QUIGG

Attesting Officer

Commissioner of Patents and Trademarks